United States Patent [19]
Pierret et al.

[11] Patent Number: 6,064,186
[45] Date of Patent: May 16, 2000

[54] METHOD FOR MANAGING THE EXCITATION OF AN AUTOMOBILE ALTERNATOR BY MEANS OF A REGULATOR

[75] Inventors: Jean-Marie Pierret, Paris; Raymond Rechdan, Saint-Maurice, both of France

[73] Assignee: Valeo Equipments Electriques Moteur, Creteil, France

[21] Appl. No.: 08/990,645

[22] Filed: Dec. 15, 1997

[30] Foreign Application Priority Data

Dec. 16, 1996 [FR] France .................................. 9615419

[51] Int. Cl.[7] ...................................................... H02P 9/00
[52] U.S. Cl. .............................................. 322/28; 322/32
[58] Field of Search ............................. 290/406; 322/18, 322/20, 27, 28, 29, 32, 58

[56] References Cited

U.S. PATENT DOCUMENTS

| | | | |
|---|---|---|---|
| 4,346,337 | 8/1982 | Watrous ................................... | 322/25 |
| 4,362,982 | 12/1982 | Akita et al. .............................. | 320/64 |
| 4,388,587 | 6/1983 | Lamoth et al. ........................... | 323/283 |
| 4,883,973 | 11/1989 | Lakey et al. .............................. | 290/31 |
| 5,079,496 | 1/1992 | Pierret et al. ............................. | 322/28 |
| 5,231,344 | 7/1993 | Marumoto et al. ....................... | 322/14 |
| 5,521,485 | 5/1996 | Vogelsberger ............................ | 322/28 |
| 5,550,456 | 8/1996 | Shekhawat et al. ...................... | 322/25 |
| 5,629,606 | 5/1997 | Asada ........................................ | 322/28 |
| 5,737,199 | 4/1998 | Kanamori et al. ........................ | 363/56 |
| 5,754,030 | 5/1998 | Maehara et al. .......................... | 322/19 |

FOREIGN PATENT DOCUMENTS

| | | |
|---|---|---|
| 0 330 561 | 2/1989 | European Pat. Off. . |
| 0 611 215 | 8/1994 | European Pat. Off. . |

OTHER PUBLICATIONS

French Search Report dated Sep. 12, 1997.

*Primary Examiner*—Nicholas Ponomarenko
*Attorney, Agent, or Firm*—Morgan & Finnegan, LLP

[57] ABSTRACT

A system and method are provided to manage the excitation of an automobile alternator through the use of its regulator which delivers to the inductor of the alternator a pulse width modulation excitation signal. The regulator receives, from an external management unit, a pulse width modulation excitation control signal with a frequency less than that of the excitation signal. The regulator delivers an excitation signal with a pre-programmed cycle ratio for a sufficient duration to enable the regulator to determine the control information carried by the control signal from the management unit. The regulator continues the excitation signal with the pre-programmed cycle ratio until receipt of instruction from the management unit to regulate the battery voltage.

18 Claims, 5 Drawing Sheets

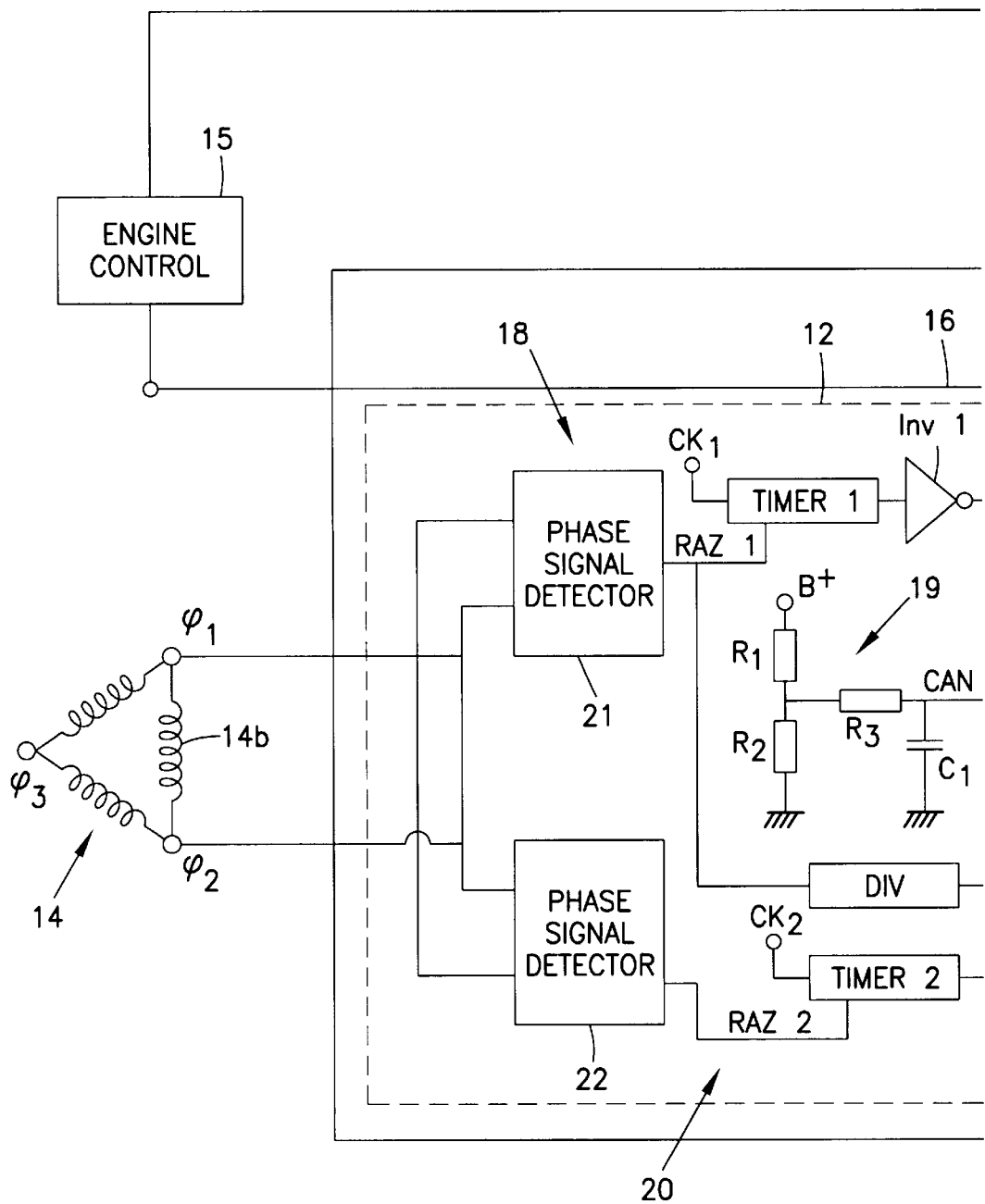
Fig. 1.1

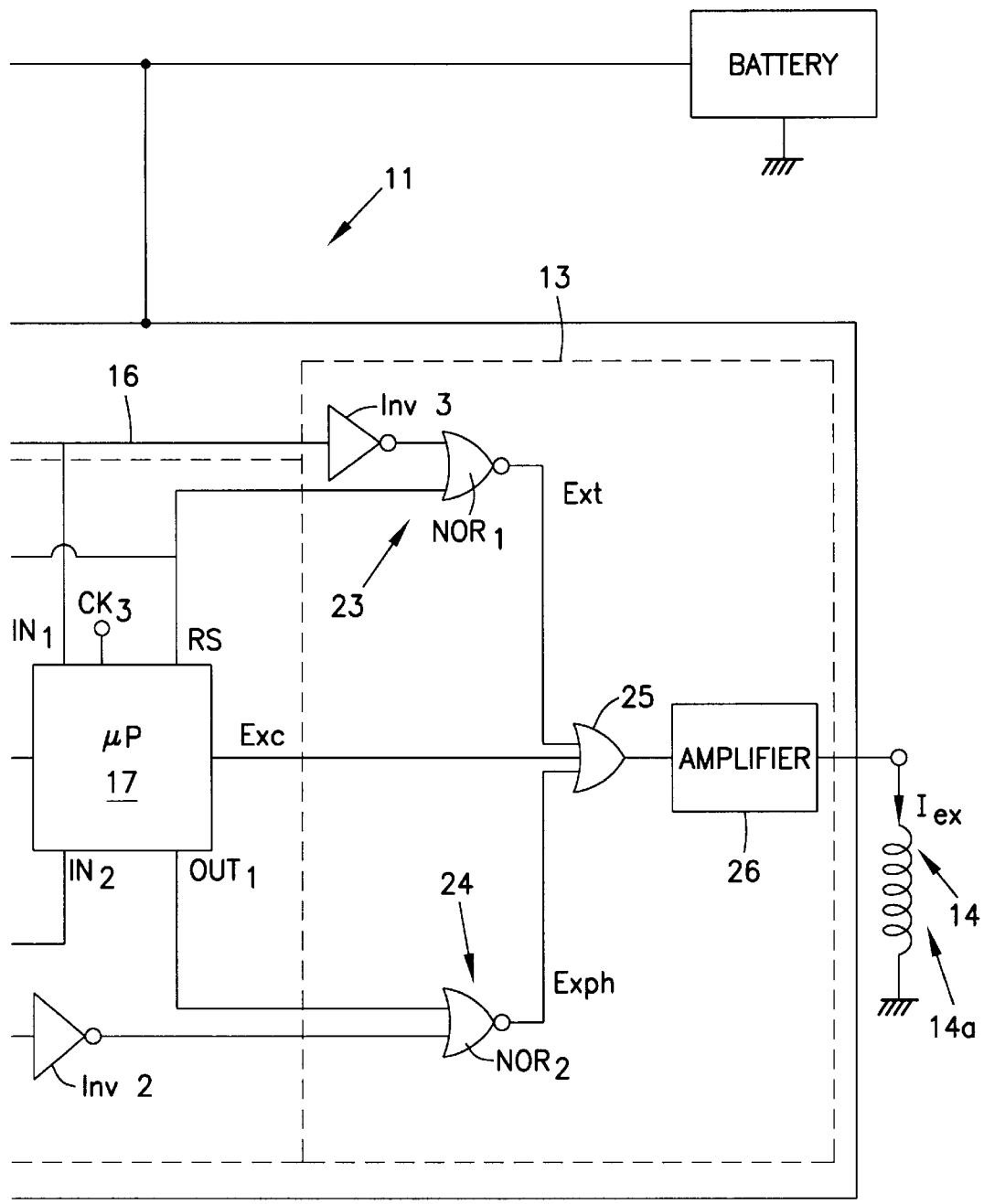
Fig. 1.2

METHOD FOR MANAGING THE EXCITATION OF AN AUTOMOBILE ALTERNATOR BY MEANS OF A REGULATOR

FIELD OF THE INVENTION

The present invention relates to a method for managing the excitation of an automobile alternator by means of a regulator delivering to said alternator a pulse width modulation excitation signal.

BACKGROUND OF THE INVENTION

One aim of the invention is to propose a management method which is suited to the case of a regulator receiving, in the form of a pulse width modulation signal, control instructions transmitted to it by an external management unit, which is for example the vehicle engine control computer.

The signal emitted by a management unit of the engine control computer type often has a frequency lower (around 5 to 10 Hz) than that of the excitation signal emitted by the regulator (around 50 Hz).

A certain amount of time therefore elapses after the activating of the regulator before the latter has determined the control information carried by the signal transmitted by the computer.

SUMMARY OF THE INVENTION

According to the present invention there is provided a method for managing the excitation of an automobile alternator by means of its regulator, said regulator delivering to the inductor of the alternator a pulse width modulation excitation signal, wherein, the regulator receiving, from an external management unit, a pulse width modulation excitation control signal with a frequency less than that of the excitation signal, it delivers, in a triggering phase, a pre-excitation signal with a pre-programmed cycle ratio, this triggering phase being of sufficient duration to enable the regulator to determine the control information carried by the signal emitted by the management unit, and wherein, at the end of this initiation phase, the regulator continues this pre-excitation until it receives, from the management unit, the instruction to regulate the battery voltage.

In the method proposed by the invention, the regulator delivers, in an initiation phase, a pre-excitation signal with a pre-programmed cycle ratio, this triggering phase being of sufficient duration to enable the regulator to determine the control information carried by the signal emitted by the management unit and, at the end of this initiation phase, the regulator continues this pre-excitation until it receives, from the management unit, the instruction to regulate the battery voltage.

With such an operating sequence, the regulator is in action as soon as it is activated and even before it has determined the control information carried by the signal emitted by the management unit.

This method is advantageously supplemented by the following different characteristics taken alone or in all their technically possible combinations:

the pre-programmed cycle ratio is around 12.5%;

during the phase of continuing the pre-excitation, the regulator measures the charge voltage of the battery and reduces the cycle ratio of the excitation signal when the voltage measured becomes greater than a given threshold;

when the voltage measured becomes greater than the threshold, the regulator gives to the excitation signal a minimum cycle ratio of around 4.5%;

the cycle ratio of the signal emitted by the management unit corresponds, beyond a given threshold, to the voltage value at which the regulator must regulate the charging voltage of the battery, the regulator continuing the pre-excitation as long as the cycle ratio is below the threshold;

the frequency of the signal emitted by the management unit is variable and defines the charging rate of the regulator when this regulator has a progressive charging function;

when the signal emitted by the management unit has a cycle ratio and/or a frequency outside a given range, the regulator regulates the battery charging voltage at a pre-programmed value;

the regulator transmits in return to the management unit information relating notably to the excitation signal and/or to the presence of an operating fault;

the signal emitted by the regulator corresponds to the superimposition of the excitation signal on the pulses of the signal transmitted by the management unit;

the signal emitted by the regulator corresponds to the signal transmitted by the management unit, the pulses of which are amplitude modulated as a function of the cycle ratio of the excitation signal;

the signal emitted by the regulator is a three-level signal corresponding to the mixing of the signal transmitted by the management unit and the excitation signal.

BRIEF DESCRIPTION OF THE DRAWINGS

Other characteristics and advantages of the invention will also emerge from the following description. This description is purely illustrative and non-limitative. It should be read in connection with the accompanying drawings in which:

FIG. 1 is a schematic representation of an alternator regulation device having a regulator controlled by an external management unit;

DESCRIPTION OF THE PREFERRED EMBODIMENTS

Figure 2:
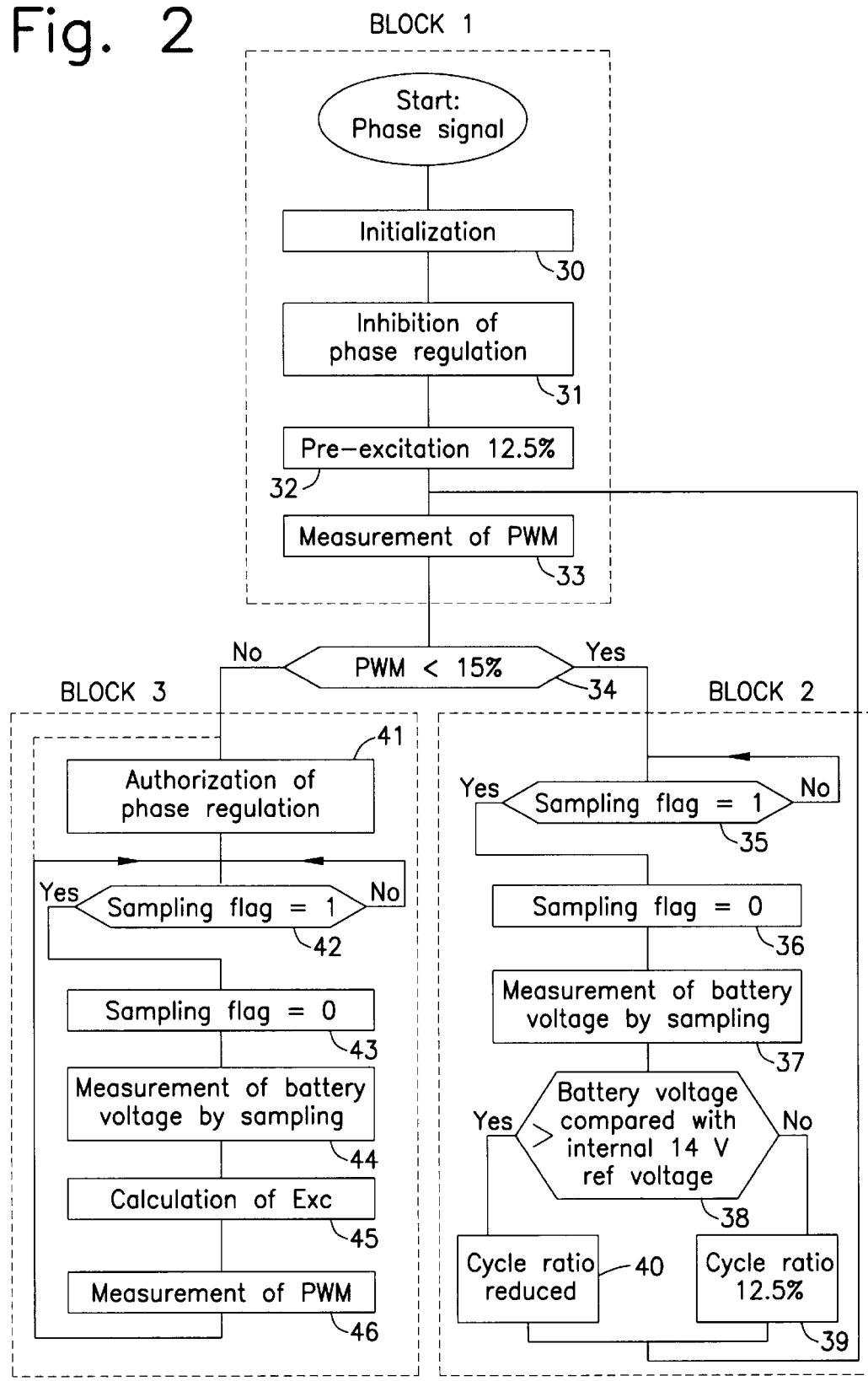
FIG. 2 is a flow diagram on which are entered the different steps of a control sequence in accordance with one possible embodiment.

FIG. 1 depicts a possible structure for a regulation device which has—in addition to a regulator 11 proper, which delivers excitation signals to the inductor 14a of an alternator 14—a management unit 15 external to the regulator 11 and to the alternator 14, which controls the regulator 11.

The regulator 11 is formed on the one hand by a control circuit 12 receiving a phase signal, which corresponds to a voltage between two phases of an armature 14b of the alternator 14 (inputs $\phi_1$ and $\phi_2$), and on the other hand a power circuit 13, which delivers an excitation current to the inductor 14a of the alternator 14.

The management unit 15 is connected both to the control circuit 12 and to the power circuit 13 (wired connections 16).

This management unit 15 is advantageously the engine control computer. It transmits to the control and power circuits 12 and 13 a pulse width modulation (PWM) signal.

The power circuit 13, which is connected directly to the management unit 15, generates by itself, on receiving the signal emitted by the management unit 15, an excitation signal which magnetizes the alternator.

As for the control circuit 12, this is activated by the appearance of the phase signal between the inputs $\phi_1$ and $\phi_2$, that is to say when the alternator 14 is in rotation—and therefore capable of charging the battery.

More particularly, the control circuit 12 includes a computer comprising a microcontroller 17, a phase signal detection circuit 18 whose output is connected to an input RS of the microcontroller 17, a voltage filtering circuit 19 (divider bridge $R_1$, $R_2$, $R_3$ and capacitor $C_1$) which connects the output voltage of the alternator to an input CAN of the microcontroller 17 via a power supply terminal B+, and a circuit 20 for regulating the phase signal.

The phase signal detection circuit 18 includes a signal detector 21, which receives as an input the voltage between the inputs $\phi_1$ and $\phi_2$. It generates a high-level signal when this voltage is above 0.6 volts. The signal $RAZ_1$ output from this detector 21 is sent to a timing device $TEMP_1$ which is connected in series with a logic inverter Inv1, whose output is itself injected onto the input RS of the microcontroller 17.

The phase signal regulation circuit 20 also comprises a phase signal detector 22 connected to a timing device $TEMP_2$ in series with a logic inverter Inv2. The phase detector 22 generates a signal $RAZ_2$, which is at high level when the voltage between the inputs $\phi_1$ and $\phi_2$ is above 7 volts.

The power circuit 13 for its part has a circuit 23 (logic inverter Inv3 and NOR gate ($NOR_1$)) for enabling the signal emitted by the management unit 15, a circuit 24 (NOR gate $NOR_2$) for enabling the phase regulation, a collector 25 for the different excitation signals (OR gate), and a power amplifier 26 which supplies the excitation current Iex to the inductor.

When the alternator is not rotating, the phase detector 21 does not initiate the timer $TEMP_1$, whose output level remains at 1. The output of the inverter Inv1 remains at zero and the microcontroller 17 is not activated. Thus, when the management unit 15 delivers a signal PWM, the microcontroller 17 takes no account of it. On the other hand, this signal PWM is reconstituted at the output (Ext) of the gate $NOR_1$. At the same time, the output (Exc) of the microcontroller 17 remains at zero since the latter is not activated. For the same reason, the output $OUT_1$ is at level 1, which forces the level 0 at the output (Exph) of the gate $NOR_2$. The only excitation signal available for the amplifier 26 is therefore the signal PWM reconstituted at the output (Ext) of the gate $NOR_1$. Consequently, when the alternator is not rotating, the excitation signal corresponds to the sole signal PWM.

When the alternator starts to rotate, the phase detector 21 detects the presence of a phase signal at the inputs $\phi_1$ and $\phi_2$, and resets the timer $TEMP_1$ to zero. The output of the inverter Inv1 goes to 1, as well as the input RS of the microcontroller 17, which is then activated.

The microcontroller 17 then manages the excitation of the armature 14a according to the operating sequence which corresponds to the flow diagram of FIG. 2.

This sequence comprises three parts:
initiation of the regulator (BLOCK 1),
maintenance of the pre-excitation (BLOCK 2), and
normal regulation (BLOCK 3).

Triggering of Regulator (BLOCK 1)

This triggering phase takes place as soon as the phase signal has an amplitude above 0.6 volts, that is to say the input (RS) of the microcontroller 17 changes from level 0 to level 1, while the signal Ext goes to level 0.

After initialization of the different variables (step 30), the regulation of the phase signal is inhibited (the output OUT1 goes from level 0 to level 1) (step 31).

Then the microcontroller 17 supplies its own pre-excitation signal at the output Exc. This signal is for example advantageously a signal with a frequency of 50 Hz, whose cycle ratio is equal to 12.5% (step 32).

This pre-excitation lasts at least sufficient time to enable the microcontroller 17 to calculate the value of the cycle ratio, and of the period of the control signal PWM transmitted by the management unit 15 via the connection 16 (step 33).

It will be noted that the control signal PWM has a frequency of around 5 Hz to 10 Hz, so that the duration of this calculation time is at least around one second.

Maintenance of Pre-excitation (BLOCK 2)

Provision is made for the pre-excitation state to be able to be maintained, on instruction from the management unit 15, so as not to charge the battery and reduce the torque of the alternator during the acceleration of the engine.

To this end, the management unit 15 emits a control signal PWM whose cycle ratio is below 15%.

The value of the cycle ratio of the signal PWM is compared with this threshold of 15% (test 34) just after the step 33 of determining the cycle ratio and the period of the the signal.

If the cycle ratio of the signal PWM is indeed below this threshold of 15%, the microcontroller 17 implements the different steps of block 2.

Firstly, the microcontroller 17 waits until a measurement of the voltage B+ is performed by a sampling at its input CAN, to which the filtering circuit 19 is connected: a sampling flag goes to the value 1 when a measurement can be performed, and then drops to 0 again (35, 36, 37).

The value of the battery voltage B+ is then compared with a programmed internal reference value, for example around 14 volts (test 38):

if the value of the battery voltage B+ is less than the value of the internal reference, the pre-excitation signal with a cycle ratio equal to 12.5% is kept (decision step 39), if the value of the battery voltage B+ is equal to or greater than the value of the internal reference, the cycle ratio of the pre-excitation signal is reduced to a minimum value, for example around 4.5%, in order not to overcharge the battery (decision step 40).

Then the microcontroller 17 resumes the processing at step 33 by once again measuring the cycle ratio of the signal PWM in order to compare it with the threshold of 15%.

Normal Regulation (BLOCK 3)

On instruction from the management unit 15, provision is made to quit the pre-excitation state in order to effect a normal regulation of the battery voltage.

This instruction is given when the management unit 15 has recognized that the engine is no longer in start-up phase and that it can withstand the torque of the alternator 14 when the latter is charging the battery.

In this case, the management unit 15 emits a signal PWM, whose cycle ratio:

is greater than or equal to the threshold of 15%,
represents the regulation voltage provided by the management unit 15.

The response to test 34 being "no", the microcontroller 17 implements the steps of block 3.

It first of all once again enables the regulation of the phase signal at 7 volts, its output (OUT 1) changing from level 1 to level 0 (step 41).

Thus, if the voltage between $\phi_1$ and $\phi_2$ falls below 7 volts, the phase detector 22 does not reset to zero the timer $TEMP_2$, whose output goes to level 1, which sets to zero the output of the inverter Inv2. The output OUT1 also being at zero, the output of the gate $NOR_1$ delivers an excitation signal Exph at level 1, which increases the excitation current Iex via the OR gate 25 and amplifier 26.

After this resetting of the output OUT1 to zero, the microcontroller 17 waits until a measurement of the voltage B+ is effected by a sampling at its input CAN, to which the smoothing circuit 19 is connected: a sampling flag goes to the value 1 when a measurement can be carried out, and then drops to 0 again (steps 42, 43, 44).

Then, in a step 45, the microcontroller calculates the duration of the pulses of the excitation signal Exc as a function of the voltage reference provided by the management unit 15 (cycle ratio of the control signal PWM) and as a function of the actual value of the battery voltage measured at the time of sampling.

In a step 46, the cycle ratio of the signal PWM is once again determined and processing is resumed at step 42, or preferably at step 41, in order to determine a new measurement of the voltage B+.

Naturally, in a variant, step 46 could not exist, the processing being resumed at step 33 directly after the end of calculation of step 45, which makes it possible to return at any time to the pre-excitation step on instruction from the management unit 15.

The processing is stopped only when the phase signal disappears (input RS at level 0), which corresponds to the stoppage of the engine.

When the signal PWM disappears or does not correspond to certain characteristics (frequency and/or cycle ratio), the calculation of the duration of the excitation signal is established from a reference internal to the regulator. For example, account is not taken of the signal PWM if its frequency is not between 3 and 15 Hz and if its cycle ratio is not between 5% and 95%. In this case, a reference corresponding to 14 volts, internal to the regulator, is used.

Parameters other than the voltage reference can be introduced in order to define the period of the excitation signal. In particular, the duration of the pulses of this signal can vary progressively. This progressiveness can be defined:

by parameters internal to the regulator, as a function of the frequency of the phase signals, by the management unit 15 via the control signal PWM. For example, the duration of the pulses of the signal PWM can vary between 5 and 10 Hz, its value defining the progressive charging rate, that is to say the slope of a charging straight line, making it possible pass progressively from a zero charge to full excitation in a time between 1 and 10 seconds.

For an example of control with a progressive charging function, reference can advantageously be made to the patent FR 2 701 609.

The microcontroller 17 can also include timing circuits of the type described notably in patent applications FR 96 04855 and FR 96 04856, whose teachings are included here by reference, in order to generate the external interruptions by the phase signals and the control signal, as well as the clock signal interruptions triggering the rising and falling edges of the excitation signal and the samplings measuring the battery voltage B+.

In addition, provision is advantageously made for the connection 16 between the regulator 11 and the management unit 15 to be bidirectional and for the regulator 11 to transmit, to the management unit 15, information notably on the cycle ratio of the excitation signal emitted by the microcontroller 17, and on the appearance of any operating faults.

To this end, provision can be made for the regulator 11 to emit, in the direction of the management unit, a signal which corresponds to the superimposition of the excitation signal and pulses of the signal transmitted by the management unit 15.

Figures 3A, 3B:
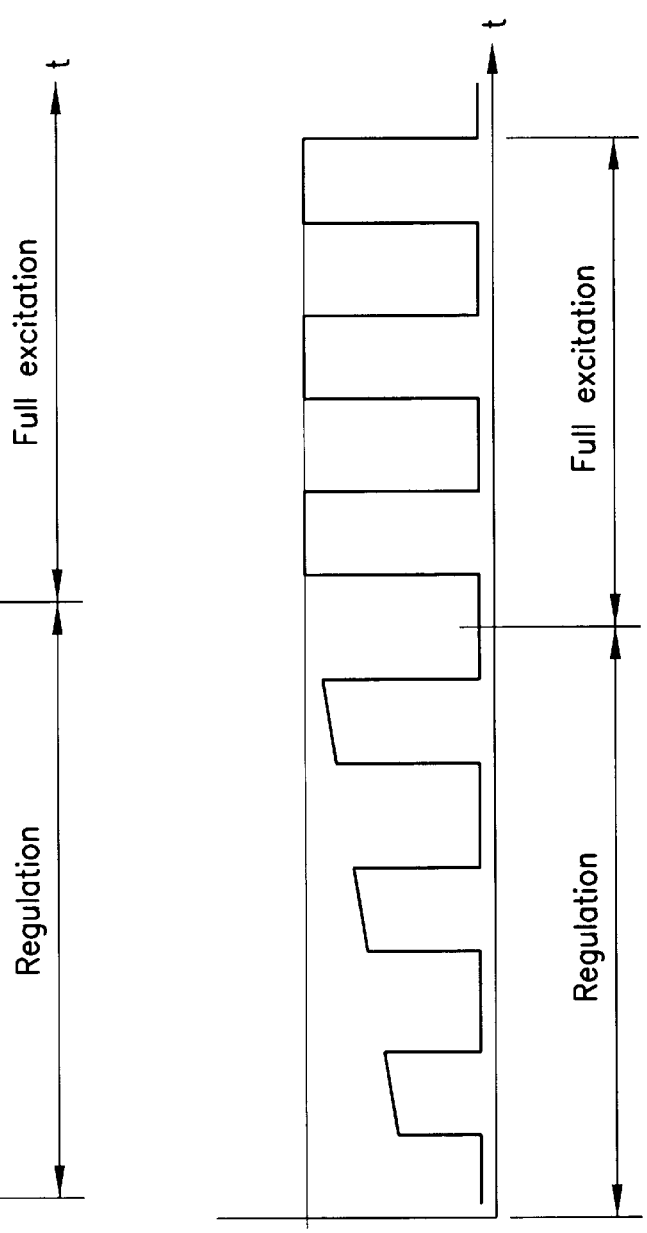
FIGS. 3a, 3b and 3c illustrate different types of signal emitted by the regulator in order to transmit to the external management unit information on the excitation signal.

A signal of this type has been illustrated in FIG. 3a. The excitation signal is there superimposed on the signal of the management unit 15 above an amplitude equal to half the voltage UB+ of the battery.

In order to signal the appearance of an operating fault, the regulator 11 forces to earth the potential of the connection between said regulator 11 and the management unit 15. The management unit 15 interprets this earthing as an operating fault in the regulator 11 or as a break in the connection 15.

In a variant, as illustrated in FIG. 3b, the signal transmitted by the regulator 11 can be a signal which corresponds to the signal PWM emitted by the management unit 15 amplitude modulated as a function of the cycle ratio of the excitation signal. This amplitude is then an analogue representation of the excitation rate and can be used by an analogue to digital converter included in the management unit 15.

Figure 3C:
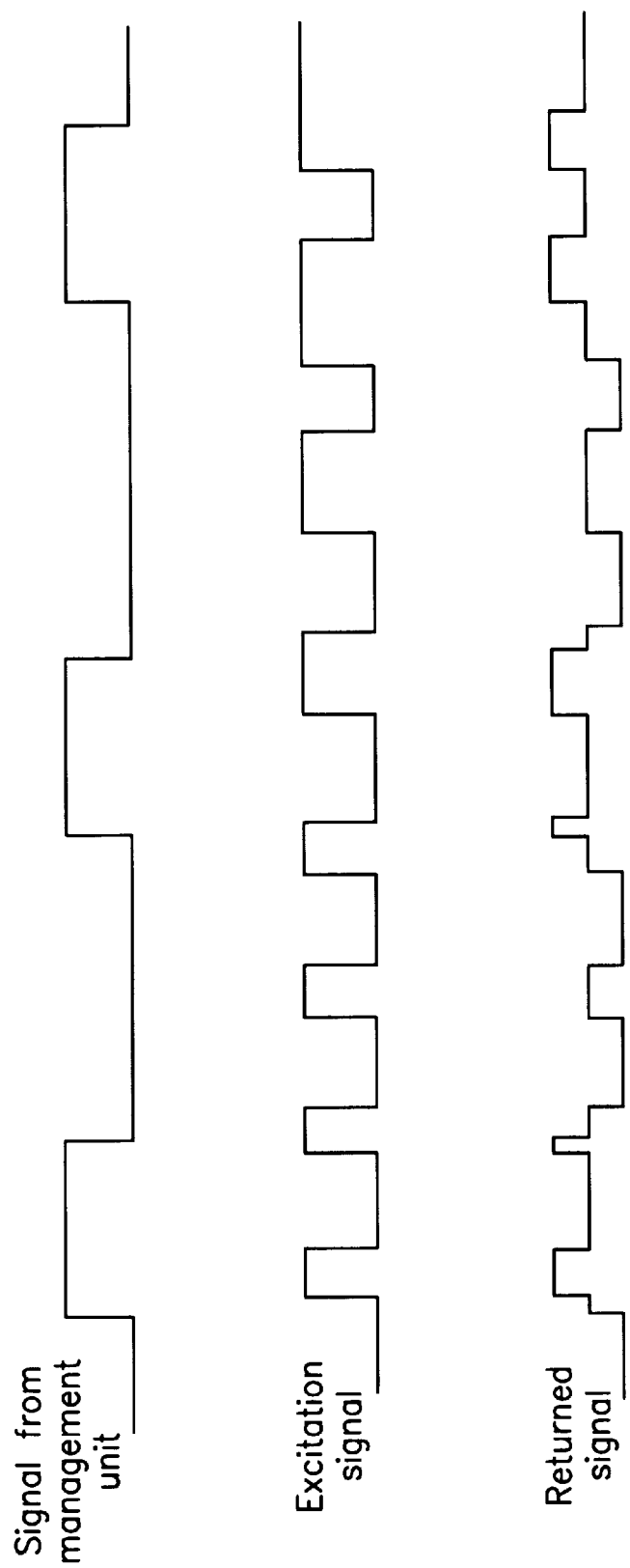

In another variant, as illustrated in FIG. 3c, the signal iii returned to the management unit 15 can be a signal on three levels, corresponding to the mixing of the excitation signal ii and the signal i transmitted by the management unit 15.

Although preferred embodiments of the invention have been described, it will be understood that the invention is not to be limited to what has been described. Rather the invention extends to the full scope of the appended claims.

What is claimed is:

1. A method of managing an excitation of an alternator of an automobile with a regulator of the automobile, the regulator delivering to an inductor of the alternator a pulse width modulation excitation signal, wherein the regulator receives, from an external management unit, a pulse width modulation excitation control signal with a frequency less than the excitation signal, the regulator delivers an excitation signal with a pre-programmed cycle ratio of a duration to enable the regulator to determine control information carried by the signal emitted by the management unit, and the regulator continues the excitation signal with the pre-programmed cycle ratio until receipt of instruction from the management unit to regulate the battery voltage.

2. The method as claimed in claim 1, wherein the pre-programmed cycle ratio is approximately 12.5%.

3. The method as claimed in claim 1, wherein, during the continuing of the excitation signal with the pre-programmed cycle ratio, the regulator measures the charging voltage of the battery and reduces the cycle ratio of the excitation signal when the measured voltage becomes greater than a given threshold.

4. The method as claimed in claim 3, wherein, when the measured voltage becomes greater than the threshold, the regulator changes the cycle ratio to a minimum cycle ratio of approximately 4.5%.

5. The method as claimed in claim 1, wherein the cycle ratio of the signal emitted by the management unit corresponds, beyond a given threshold, to a voltage value at which the regulator regulates the charging voltage of the battery, the regulator continuing the excitation signal with the pre-programmed cycle ratio if the cycle ratio is below the threshold.

6. The method as claimed in claim 5, wherein the frequency of the signal emitted by the management unit is variable and defines the charging rate of the regulator when the regulator has a progressive charging function.

7. The method as claimed in claim 5, wherein, when the signal emitted by the management unit has a cycle ratio and/or a frequency outside a given range, the regulator regulates the battery charging voltage at a pre-programmed value.

8. The method as claimed in claim 1, wherein the regulator transmits in return to the management unit information relating to the excitation signal and/or to an appearance of an operating fault.

9. The method as claimed in claim 8, wherein the signal emitted by the regulator corresponds to the superimposition of the excitation signal on the phases of the signal transmitted by the management unit.

10. The method as claimed in claim 8, wherein the signal emitted by the regulator corresponds to the signal transmitted by the management unit, the pulses of which are amplitude modulated as a function of the cycle ratio of the excitation signal.

11. The method as claimed in claim 8, wherein the signal emitted by the regulator is a signal with three voltage levels which correspond to the mixing of the signal transmitted by the management unit and the excitation signal.

12. A method of managing an excitation of an alternator of a vehicle through the use of a regulator of the vehicle and a management unit, the regulator delivering a pulse width modulation excitation signal to the alternator, the method comprising:

transmitting from the management unit a pulse width modulation excitation control signal having a frequency less than the excitation signal to the regulator;

transmitting from the regulator an excitation signal with a pre-programmed cycle ratio to the alternator having a duration to enable the regulator to determine control information carried by the control signal; and continuing transmission of the excitation signal with the pre-programmed cycle ratio until the regulator receives instruction from the management unit to regulate the battery voltage.

13. A system for managing an excitation of an alternator of a vehicle, comprising:

a regulator for providing a pulse width modulation excitation signal to the alternator; and a management unit to control the regulator through a pulse width modulation excitation control signal, wherein the regulator receives the control signal having a frequency less than the excitation signal, delivers to the alternator an excitation signal with a pre-programmed cycle ratio of a duration to enable the regulator to determine control information carried by the control signal, and continues delivery of the excitation signal with the pre-programmed cycle ratio until receipt of instruction from the management unit to regulate the battery voltage.

14. The system according to claim 13, wherein the regulator comprises:

a power circuit for delivering the excitation signal to the inductor; and a control circuit for generating the excitation signal.

15. The system according to claim 13, wherein the management unit comprises an engine control computer of the vehicle.

16. The system according to claim 13, wherein the regulator transmits to the management unit information relating to the excitation signal and/or to an appearance of an operating fault.

17. A vehicle including the system according to claim 13.

18. A system for managing an excitation of an alternator of a vehicle, comprising:

means for providing a pulse width modulation excitation signal to the alternator; and means for controlling the means for providing a pulse width modulation excitation signal through a pulse width modulation excitation control signal, wherein the means for delivering receives the control signal having a frequency less than the excitation signal, delivers to the alternator an excitation signal with a pre-programmed cycle ratio of a duration to enable the means for providing a pulse width modulation signal to determine control information carried by the control signal, and continues delivery of the excitation signal with the pre-programmed cycle ratio until receipt of instruction from the means for controlling to regulate the battery voltage.

* * * * *